US008776068B2

(12) United States Patent
Ax et al.

(10) Patent No.: US 8,776,068 B2
(45) Date of Patent: Jul. 8, 2014

(54) OPERATING METHOD FOR A COMPUTER WITH PERFORMANCE OPTIMIZATION BY GROUPING APPLICATIONS

(75) Inventors: Antonius Ax, Effeltrich (DE); Detlef Becker, Möhrendorf (DE); Karlheinz Dorn, Kalchreuth (DE); Subrata Sinha, Erlangen (DE); Vladyslav Ukis, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 887 days.

(21) Appl. No.: 12/958,666

(22) Filed: Dec. 2, 2010

(65) Prior Publication Data

US 2011/0138392 A1   Jun. 9, 2011

(30) Foreign Application Priority Data

Dec. 8, 2009   (DE) .......................... 10 2009 057 401

(51) Int. Cl.
| | | |
|---|---|---|
| G06F 9/46 | (2006.01) | |
| G06F 9/44 | (2006.01) | |
| G06F 9/48 | (2006.01) | |
| G06Q 10/00 | (2012.01) | |
| G06Q 10/06 | (2012.01) | |

(52) U.S. Cl.
CPC .. *G06F 9/48* (2013.01); *G06F 9/46* (2013.01); *G06F 8/00* (2013.01); *G06Q 10/06* (2013.01)
USPC ............ 718/102; 718/100; 717/100; 705/1.1; 705/7.11

(58) Field of Classification Search
None
See application file for complete search history.

(56) References Cited

U.S. PATENT DOCUMENTS

| 2005/0246678 A1 | 11/2005 | Moore et al. | |
|---|---|---|---|
| 2006/0236308 A1* | 10/2006 | Lamb et al. | 717/121 |
| 2011/0055408 A1* | 3/2011 | Baker et al. | 709/228 |

FOREIGN PATENT DOCUMENTS

DE   10 2009 043 253   3/2011

OTHER PUBLICATIONS

German priority document DE 10 2009 057 401.8 filed Dec. 8, 2009 (unpublished).

* cited by examiner

*Primary Examiner* — Qing Wu
(74) *Attorney, Agent, or Firm* — Harness, Dickey & Pierce, P.L.C.

(57) ABSTRACT

In at least one embodiment, if the pre-start level has the value empty container, the computer creates a container within the framework of the pre-start but does not load any application into the container. If the pre-start level has the value application, the computer creates a respective container within the framework of the pre-start for each application. If the pre-start level has a higher value, the computer determines within the framework of the pre-start a degree of grouping for the applications assigned to the respective pre-started unit, and groups the applications in accordance with the degree of grouping determined into at least one container group. Within the framework of the processing of the complex tasks, the computer terminates on switching from one application to another application, the application still being executed only if the application involves an application not able to be suspended.

16 Claims, 8 Drawing Sheets

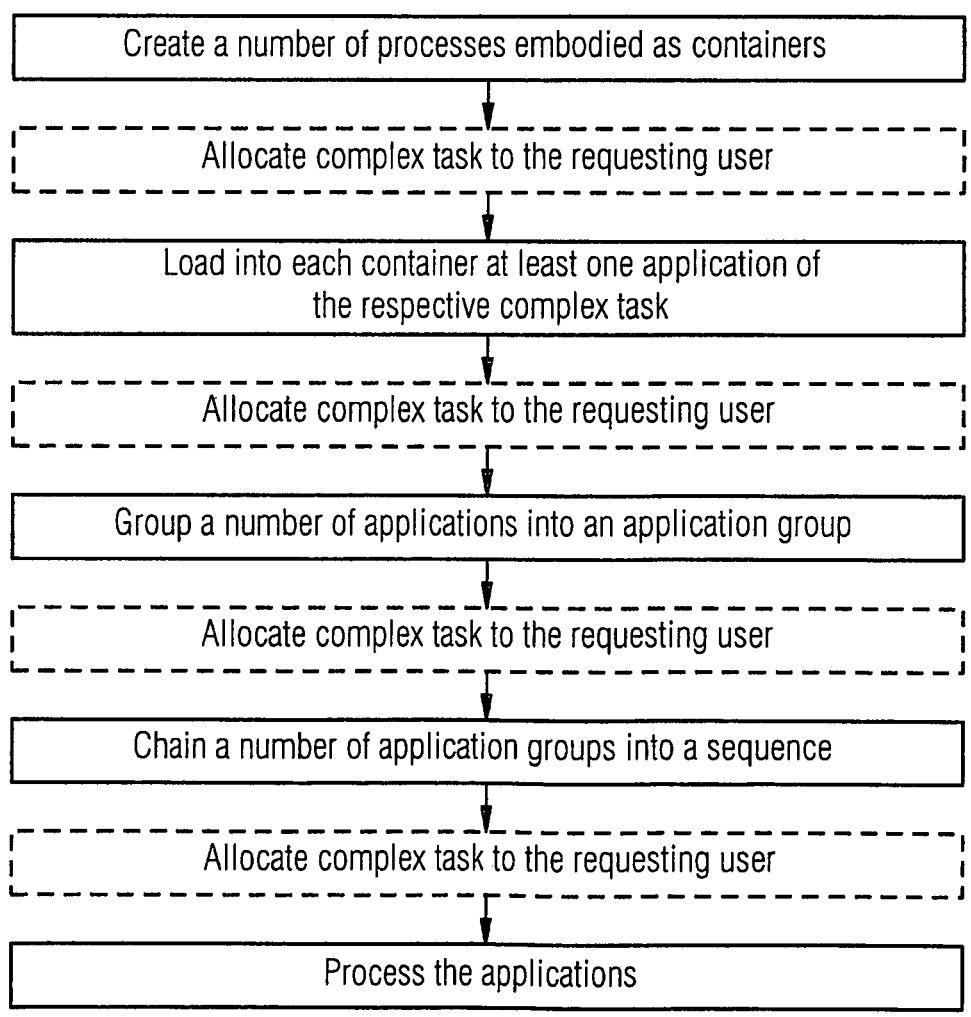

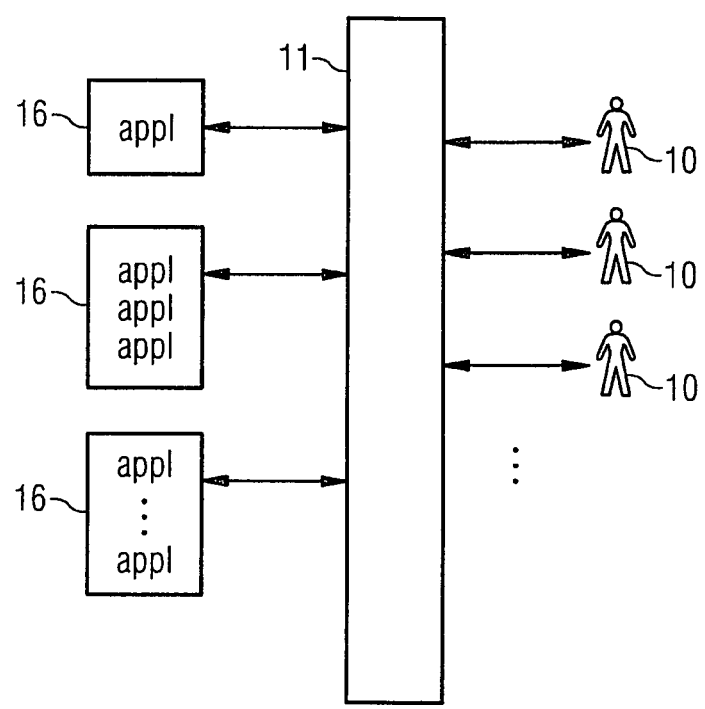

FIG 7

13 appl:  Maturity level R = 1 ... 4

R=1:  "not able to be suspended"
  R=2:  "able to be suspended, but only able to run on its own in the container"
  R=3:  "able to be suspended and able to run with other applications in the same container"
  R=4:  "able to be suspended and to be run in a number of configurations with other applications in the same container"

FIG 9

| user 1: | complex task 1: | sequence 1 |
|---|---|---|
|  | complex task 2: | sequence 4 |
|  | complex task 3: | application group 4 |
|  | complex task 4: | sequence 6 |

| user 2: | complex task 1: | ..... |
|---|---|---|
|  | complex task 2 | ..... |
|  | ..... |  |

.....

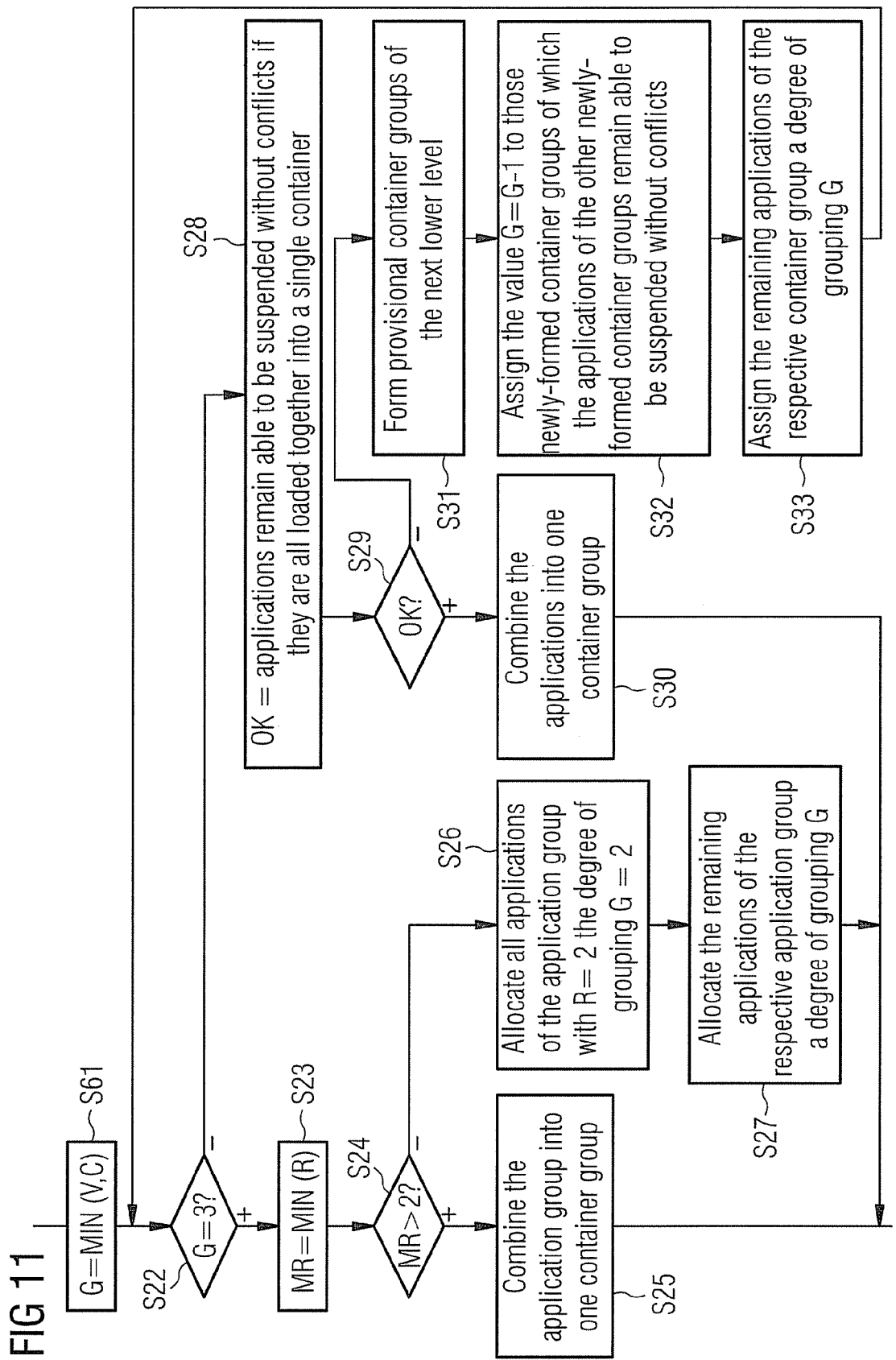

OPERATING METHOD FOR A COMPUTER WITH PERFORMANCE OPTIMIZATION BY GROUPING APPLICATIONS

PRIORITY STATEMENT

The present application hereby claims priority under 35 U.S.C. §119 on German patent application number DE 10 2009 057 401.8 filed Dec. 8, 2009, the entire contents of which are hereby incorporated herein by reference.

FIELD

At least one embodiment of the present invention generally relates to an operating method for a computer, which at the request of a number of users, processes a number of complex tasks within the framework of its operating system, with each complex task able to be requested by at least one of the users.
  whereby, within the framework of executing each complex task, the computer creates a number of processes embodied as containers,
  whereby the computer loads at least one application into each of the containers created within the framework of the complex task,
  whereby the computer combines the applications loaded into the containers within the framework of the execution of the respective complex task into at least one application group,
  whereby the computer, in the event of it forming a number of application groups within the framework of executing the respective complex task, chains these application groups into a sequence of application groups,
  whereby application groups following each other immediately within a sequence differ by at least one application,
  whereby, in the case of a single application group, the application group represents the single complex task and in the case of a sequence of application groups, the sequence of application groups represents the respective complex task.

At least one embodiment of the present invention further generally relates to a computer program comprising machine code which is able to be processed directly by a computer and of which the processing by a computer causes the computer to execute this type of operating method.

BACKGROUND

Containers are specially-designed processes into which a number of applications are loaded and in which they are able to be processed. Containers are known per se to persons skilled in the art.

Combining the applications into application groups defines which application interacts with which other application in which manner. This relates in particular to data exchange and to how the applications call each other The combining of applications into application groups is also known to persons skilled in the art.

A sequence of application groups is a succession of application groups. A respective application group is generally terminated as a result of a corresponding entry by the user. In this case the transition to the respective next application group is automatic or the sequence is ended automatically in the case of the last application group. Sequences of application groups are also known to persons skilled in the art.

The topics discussed above are generally known. They are employed in many areas of work, including the entry, editing and analysis of the data of medical imaging systems (known as medical modalities).

Medical modalities generate ever greater volumes of data during patient examinations. These volumes of data are analyzed by doctors in order to create patient diagnoses. Highly-specialized medical software applications (=complex tasks within the meaning of the present invention) which can present the data volumes in a suitable form for the doctor are used for the analysis.

The software applications are only of advantage for the doctors if they perform outstandingly well. In particular the functionalities of data loading and data processing must run without perceptible delays. Only then will the doctors recognize the advantage of using the software applications in diagnosis.

The volumes of data to be processed by the applications are becoming ever larger. Processing them and loading them therefore demands even more time. The problem of performance optimization thus arises.

In the known systems the complex tasks are generally processed on servers. Servers exist for medical applications which especially include the computing-intensive business logic of the complex tasks.

In the known systems performance optimizations for these types of servers have generally been restricted to what is referred to as farming. In farming a number of physical servers will be used on which the same software always runs. A specific device—known as the load balancer—interrogates each respective server as to its current load. All queries to the community of the servers are first accepted by the load balancer which then forwards them to that server which has the smallest load at this point in time. Farming thus allows a performance improvement to be achieved by virtue of a number of servers processing the complex tasks of the user in parallel with optimum load distribution.

Performance optimizations within a server or generally within a computer are less well-known. In many cases they are not comprehensive but only cover a specific area in the server/computer. Thus for example in the older German patent application "Verfahren zur Verringerung der Wartezeit bei erstmaliger Durchführung von Arbeitsschritten" ("Method for reducing the waiting time when operating steps are first executed") of Siemens AG, official file reference at the German patent and trademark office 10 2009 043 253.1, application date Sep. 28, 2009, the entire contents of which are hereby incorporated herein by reference, an operating method for a computer is explained in which the computer starts processes embodied as containers although the process is not yet requested by a user and loads into the containers applications which are likely to be needed by the user.

The cited German patent application has not as yet been published on the day of application of the present invention and does not therefore represent any generally known prior art.

Each process created and administered by the operating system of the computer will be allocated resources of the computer by the operating system. This applies regardless of whether the process is embodied as a container or not. It is thus of advantage to keep the number of processes as low as possible. From the standpoint of resource optimization it would therefore be optimal to load as many applications as possible into a single container.

The more applications are loaded into a single container the more complex is the design of the container-internal administration of the applications. The operating behavior of the container also becomes more unstable. From the standpoint of container-internal complexity and stability it would thus be optimal to load as few applications as possible into each container, in an extreme case only a single application.

When an application is loaded into the container, loading (=starting) the application demands a certain time. Likewise ending (=terminating) the application needs a certain time. Starting the application for the first time can (obviously) not be avoided. It is however more efficient for the application not to be terminated later but only to be suspended so that it can be resumed (=resume) later. The terms "suspend" and "resume" have a rigidly-defined meaning for a person skilled in the art of computing.

There are applications for which suspend and resume are not possible. These types of applications must always be terminated and restarted later if necessary. However in many cases a suspend-resume cycle is basically possible. Whether a suspend-resume cycle is possible in concrete terms can however depend on further factors. In particular the question can depend on whether and if necessary which other applications are loaded into the same container and how the applications interact with one another.

SUMMARY

In at least one embodiment of the present invention, possibilities are created in which a complex task requested by a user can be processed in a time-optimized manner while taking into account the circumstances given above.

At least one embodiment of the present invention is achieved by an operating method. Advantageous embodiments of the inventive operating method are the subject matter of dependent claims.

Inventively, in at least one embodiment, there is provision for designing an operating method by at least a pre-start level being pre-specified to the computer, the pre-start level being able to have the value empty container, the value application and at least one higher value and the higher value corresponding to one of the values application group, sequence, individual user or plurality of users, each application being assigned a respective level of maturity having one of the values not able to be suspended, able to be suspended but only able to be run on its own in the container, able to be suspended and able to be run with other applications in the same container or able to be suspended and able to be run in a number of configurations with other applications in the same container, the computer iteratively undertaking, even before the request for processing the complex tasks, a pre-start of a unit corresponding to the pre-start level, the computer, in the event of the pre-start level having the value empty container, actually creating a container within the framework of the pre-start but not yet loading any application into the container, the computer, in the event of the pre-start level having the value application, creating a container in each case within the framework of the pre-start for each application, with the exception of the applications not able to be suspended, and loading the respective application into the container created for the respective application, the computer, in the event of the pre-start level having the higher value, determining a degree of grouping within the framework of the pre-start for the applications assigned to the respective pre-started unit with the exception of the applications not able to be suspended using their level of maturity, combining the applications into at least one container group in accordance with the degree of grouping determined, creating a container in each case for each container group and loading each container group into the container created for the respective container group, the computer determining the degree of grouping such that the applications combined into the respective container group remain able to the suspended within the respective container group without conflicting with one another, and the computer, within the framework of processing the complex tasks, after assignment to one of the users, on switching from one application to another application, only terminating the application still being executed if it involves an application not able to be suspended and else suspending the applications still being executed.

The pre-start levels are defined as follows:

Empty container: Only an empty container is to be created into which no applications will be loaded however.

Application: An empty container is to be created initially into which a single application is then to be loaded.

Application group: An application group is to be started. The applications of the application group can be loaded as an alternative into a single container or into a number of containers.

Sequence: A sequence of application groups is to be started. The application groups of the sequence are to be loaded into at least one container.

Individual user: All complex tasks which are able to be requested by an individual user are to be pre-started.

Plurality of users: All complex tasks which are able to be requested by a number of users are pre-started.

The pre-start levels form a classification. The classification corresponds to the sequence in which the pre-start levels are listed above. The listing begins with the lowest pre-start level and ends with the highest pre-start level.

The levels of maturity are defined as follows:

Not able to be suspended: The corresponding application cannot be suspended. It must be terminated.

Able to be suspended, but only able to be run on its own in the container: The corresponding application can actually be suspended. However a suspension is only possible if the corresponding application is the only application of the corresponding container. If not, the application must be terminated.

Able to be suspended and able to be run with other applications in the same container: The corresponding application is able to be suspended regardless of whether there are further applications in the same container. The suspension is only possible however if the application is either on its own in the container or is a component of the single working group which is loaded into the container. If not, the application must be terminated.

Able to be suspended and able to be run in a number of configurations with other applications in the same container: The corresponding application is able to be suspended even if there are a number of application groups in the corresponding container and the corresponding application is a component of this number of application groups.

The levels of maturity likewise form a classification, with the first maturity level listed representing the lowest level, the last maturity level listed representing the highest level.

The degree of grouping corresponds to the pre-start level "application" listed above and higher. The term "using its level of maturity" is intended to mean that the degree of grouping depends on the level of maturity of the applications. The degree of grouping can however also depend on other variables. If the degree of grouping is to depend exclusively on the level of maturity, the term "on the basis of the degree of maturity" is used.

The term "able to be suspended without conflicting with one another" is intended to represent the following situation:

If an application group contains an application which is assigned the level of maturity "able to be suspended but only able to be run on its own in the container" this application must be loaded into its own container. The applications of this application group to which a higher level of maturity is assigned can be combined into the application group or form the remainder of the application group. If the application is to be combined or belong to the highest category "able to be suspended and able to be run in a number of configurations with other applications in the same container" the applications of a sequence of application groups, of an individual user or of a plurality of users can also be loaded into one and the same container. These applications form the respective container group in this case.

It is possible for the computer to determine the level of grouping individually for each container group formed within the framework of the respective pre-started unit. This method of operation is especially efficient but demands a greater complexity in order to determine the respective degree of grouping for each container group.

As an alternative it is possible for the computer to determine the degree of grouping for all container groups formed within the framework of the respective pre-started unit uniformly. This method of operation is simpler, more reliable and easier to implement. However it is not as efficient as the alternative given above.

It is possible for the computer to determine the degree of grouping exclusively on the basis of the maturity level of the applications and in doing so to determine the degree of grouping such that the number of container groups is minimized.

As an alternative it is possible
for a container level to be specified to the computer which has one of the values application, application group, sequence, individual user or plurality of users, and
for the computer to determine the degree of grouping by limiting the degree of grouping to the pre-specified container level and also determining the degree of grouping exclusively on the basis of the level of maturity of the applications such that the number of container groups is minimized.

As a rule at least two of the values "application", "application group", "sequence", "individual user" and "plurality of users" are permitted for the container level.

At least one embodiment of the invention is also achieved by a computer program, which, when run by a computer, causes the computer to execute an inventive operating embodiment of the method. The computer program can be stored in machine-readable form on a data carrier. The data carrier can especially be embodied as a mobile data carrier. As an alternative, the data carrier can be built into the computer as mass storage from which the computer program is able to be executed. The computer can especially be embodied as a server.

BRIEF DESCRIPTION OF THE DRAWINGS

Further advantages and details emerge from the subsequent description of exemplary embodiments in conjunction with the drawings. The figures show the following basic diagrams.

DETAILED DESCRIPTION OF THE EXAMPLE EMBODIMENTS

Figure 1:
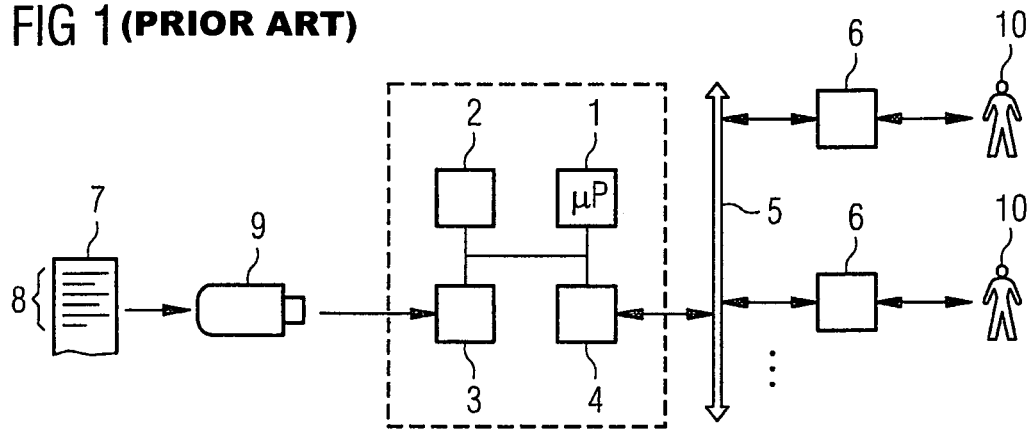
FIG. 1 a schematic diagram of a computer and how it is connected to a computer network, FIG. 2 an assignment of complex tasks to users, FIG. 3 an application group, FIG. 4 a flow diagram, FIG. 5 a number of containers, FIG. 6 a flow diagram, FIG. 7 an application and its possible level of maturity, FIG. 8 a flow diagram, FIG. 9 a user profile, FIG. 10 a flow diagram and FIG. 11 a further flow diagram.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

In accordance with FIG. 1 a computer has the usual components, especially (at least) one microprocessor 1, a main memory 2 and a mass storage device 3, for example a hard disk. The components 1, 2 and 3 are built into the computer.

The computer is preferably embodied as a server within the framework of an embodiment of the present invention, meaning that it is connected via an interface 4 and a computer network 5 to one or more clients 6. In principle however the computer could also be embodied as a stand-alone machine The computer executes a computer program 7 during operation. The computer program 7 comprises machine code 8 which is able to be directly processed by the computer. The processing of the machine code 8 by the computer causes the computer to execute an operating method which will be explained in greater detail below.

The computer program 7 is generally stored in machine-readable form on a data carrier 3, 9, for example on the mass storage device 3 or on a mobile data carrier 9. A USB memory stick is shown in FIG. 1 as an example of the mobile data carrier 9. As an alternative the mobile data carrier 9 could for example be embodied as a CD-ROM or as an SD memory card.

The computer program 7 can for example be created, then stored on the mobile data carrier 9 and copied from there into the mass storage device 3 of the computer so that it can subsequently be called and executed by the computer.

Figure 2:
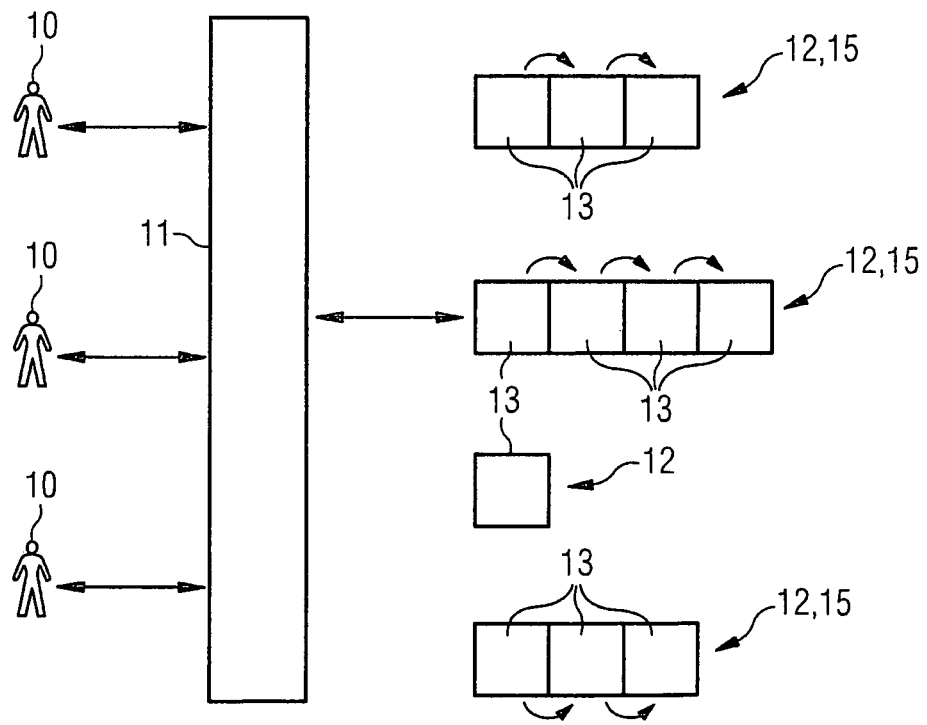

During operation the computer communicates with the number of users 10, for example with one user 10 in each case per client 6. At the request of the user 10, the computer, as depicted in FIG. 2, executes a number of complex tasks 12 within the framework of an operating system 11. The complex tasks 12 are predefined in accordance with FIG. 2. Each complex task 12 is able to be requested by at least one of the users 10.

In accordance with FIG. 2, each complex task 12 can involve an individual application group 13. Each application group 13, in accordance with FIG. 3, comprises a plurality of applications 14 which the computer links to each other and processes within the framework of the execution of the respective complex task 12.

Each application 14 needs specific input variables from other applications 14 of the respective application group 13 and delivers specific output variables to other applications 14 of the respective application group 13. The linkage of the applications 14 to the respective application group 13 is undertaken by defining for each application 14 of the application group 13 the other applications 14 of the application group 13 from which the respective application 14 receives its input variables and the other applications 14 of the application group 13 to which the respective application 14 transfers its output variables.

Often, as depicted in FIG. 2, a number of application groups 13 form a sequence 15. Application groups 13 of the sequence 15 following on directly from one another differ in such cases by at least one application 14. The individual application groups 13 of the respective sequence 15 are processed in collaboration with the requesting users 10 one after the other. In particular an input command "processing of the application group ended" usually exists. On the input of such a command by the user 10 to whom the sequence 15 of application groups 13 is currently assigned, the computer ends the processing of the application group 13 currently being executed and goes to the next application group 13 of the sequence 15. In the case of the last application group 13 of the sequence 15 the complex task 12 as a whole is of course ended.

It emerges from the information given above that the computer processes a plurality of applications 14 within the framework of executing the respective complex task 12. For processing the applications 14, in accordance with FIG. 4, the computer creates a number of processes 16 within the framework of executing the respective complex task 12. The processes 16 are embodied in the present case as containers. Containers per se are known to the person skilled in the art. These involve empty processes which are intended to form an environment for at least one application 14 capable of being executed within the framework of the operating system 11 of the computer. As a minimum, the computer creates one single container 16. In many cases the computer however creates at least one container 16 per complex task 12, often a number of containers 16 per complex task 12.

Within the framework of executing the respective complex task 12, in accordance with FIG. 4, the computer loads into each container 16 at least one application 14 of the respective complex task 12. If necessary—see FIG. 5 for further details—the computer can also load a number of applications 14 into the containers 16. The applications 14 loaded into the containers 16 are processed by the computer within the framework of the processing of the corresponding complex task 12. The processing is only undertaken after the assignment of the corresponding complex task 12 to one of the users 10.

In explanations provided thus far, the method of operation described above corresponds to that of the prior art. It is also employed within the framework of an embodiment of the present invention. In addition the procedure is as explained in greater detail below in connection with FIGS. 6 to 11. Furthermore the loading of the applications 14 into the containers 16 and possibly also the formation of the application groups 13 or of the sequence 15 of application groups 13 can be undertaken if necessary even before the assignment of the corresponding complex task 12 to one of the users 10. For this reason the step of assignment of the corresponding complex tasks to one of the users 10 is shown on one hand a number of times and on the other hand only by a dashed outline in FIG. 4. This is because only a single step of the steps of assignment shown by dashed lines in FIG. 4 is present. Which of these steps is present can however vary from case to case.

A pre-start level V is pre-specified to the computer. The pre-start level V can for example be set by a system operator of the computer on commissioning of the computer or during maintenance and service work. The pre-start level V can have the value one, the value two and at least one of the values three to six. In particular it is possible for the values one, two, three, four, five and six to all be permissible.

The pre-start level V specifies which unit the computer is to pre-start even before the request for processing one of the complex tasks 12 by a user 10. This is explained in greater detail below in conjunction with FIG. 6.

Figure 6:
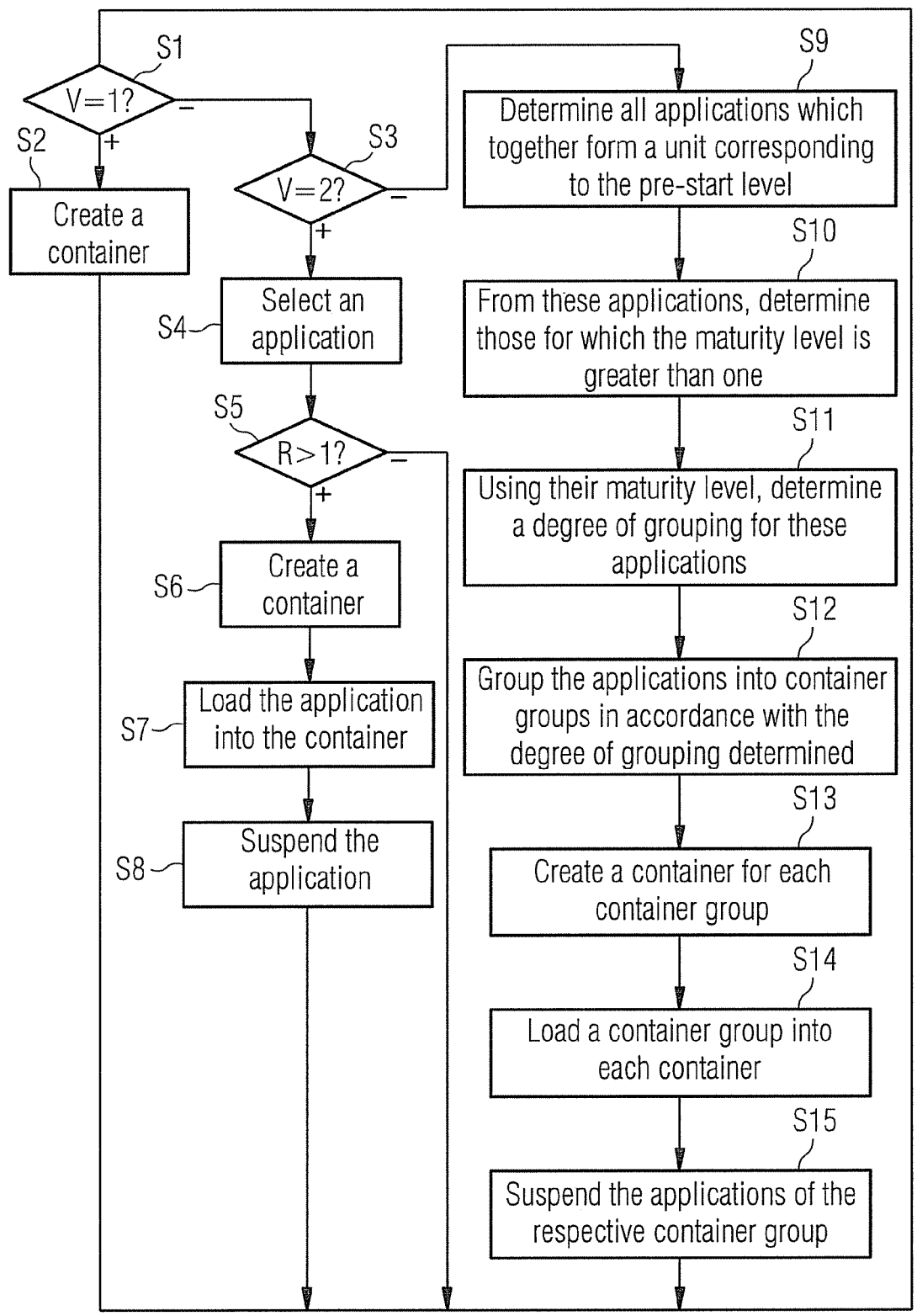

In accordance with FIG. 6 the computer checks in a step S1 whether the pre-start level V has the value one. If it has, the computer creates a container 16 in a step S2. However it does not load any application 14 into the container 16. The value one is thus given the meaning "empty container" within the framework of the pre-start level V. From step S2 the computer returns to the step S1.

If the pre-start level V does not have the value one, the computer checks in a step S3 whether the pre-start level V has the value two. If it has, the computer goes to a step S4.

In step S4 the computer selects an application 14. In a step S5 the computer checks a level of maturity R that is assigned to the selected application 14.

In accordance with FIG. 7 the level of maturity R has one of the values 1 to 4. The value one has the meaning "not able to be suspended". The value two has the meaning "able to be suspended, but only able to be run on its own in the container". The value of three has the meaning "able to be suspended and able to be run with other applications in the same container". The value four has the meaning "able to be suspended and able to be run in a number of configurations with other applications in the same container".

If the maturity level R assigned to the selected application 14 is greater than one, the computer creates a container 16 in a step S6.

In a step S7 the computer loads the selected application 14 into the container 16 just created. In addition the computer, within the framework of a step S8, suspends the application 14 loaded into the container 16. From step S8 the computer returns to one of the steps S1, S3 or S4, in accordance with FIG. 6 to step S1.

When step S4 is executed again a different application 14 from that previously selected is then selected so that all applications 14 able to be suspended will be pre-started in turn. The value two is thus given the value "application" within the framework of the pre-start level V.

If the pre-start level V has a higher value than two, i.e. between three and six, the computer goes to a step S9. In step S9 the computer determines all applications 14 which together form a unit corresponding to the pre-start level V.

In a step S10 the computer determines from these applications 14 those applications of which the maturity level R is greater than one. In a step S11 the computer determines for the applications of step S10 a degree of grouping G using their maturity levels R. The degree of grouping G is determined within the framework of step S11 such that the application is 14 grouped together in each case to a container group 17 in accordance with the degree of grouping G remain within the respective container group 17 able to be suspended without conflicting with one another.

In a step S12 the computer groups the applications 14 of step S10 in accordance with the degree of grouping determined in step S11 into the container groups 17.

In a step S13 the computer creates a container 16 in each case for each container group 17. In a step S14 the computer loads a respective container group 17 into each container 16 created in step S13. In a step S14 the computer suspends the applications 14 of the respective container group 17.

From the information given above it can be seen that the container groups 17 are not groups of containers 16, but groups of applications 14. The term "container groups" has been chosen because the applications 14 of each container group 17 will be loaded into a single common container 16 for the applications 14 of the respective container group 17 and the term "application group" is already used elsewhere.

A container group 17 can correspond to an application group 13, i.e. to one of the components of a sequence 15 of application groups 13. This is not mandatory however. A container group 17 can alternately be an individual application 14, only comprise part of an application group 13 or comprise a number of application groups 13, especially an entire sequence 15 of application groups 14 or a number of application groups 13 of sequence 15.

Steps S11 and S12 of FIG. 6 are explained below in greater detail in conjunction with FIG. 8.

Figure 8:
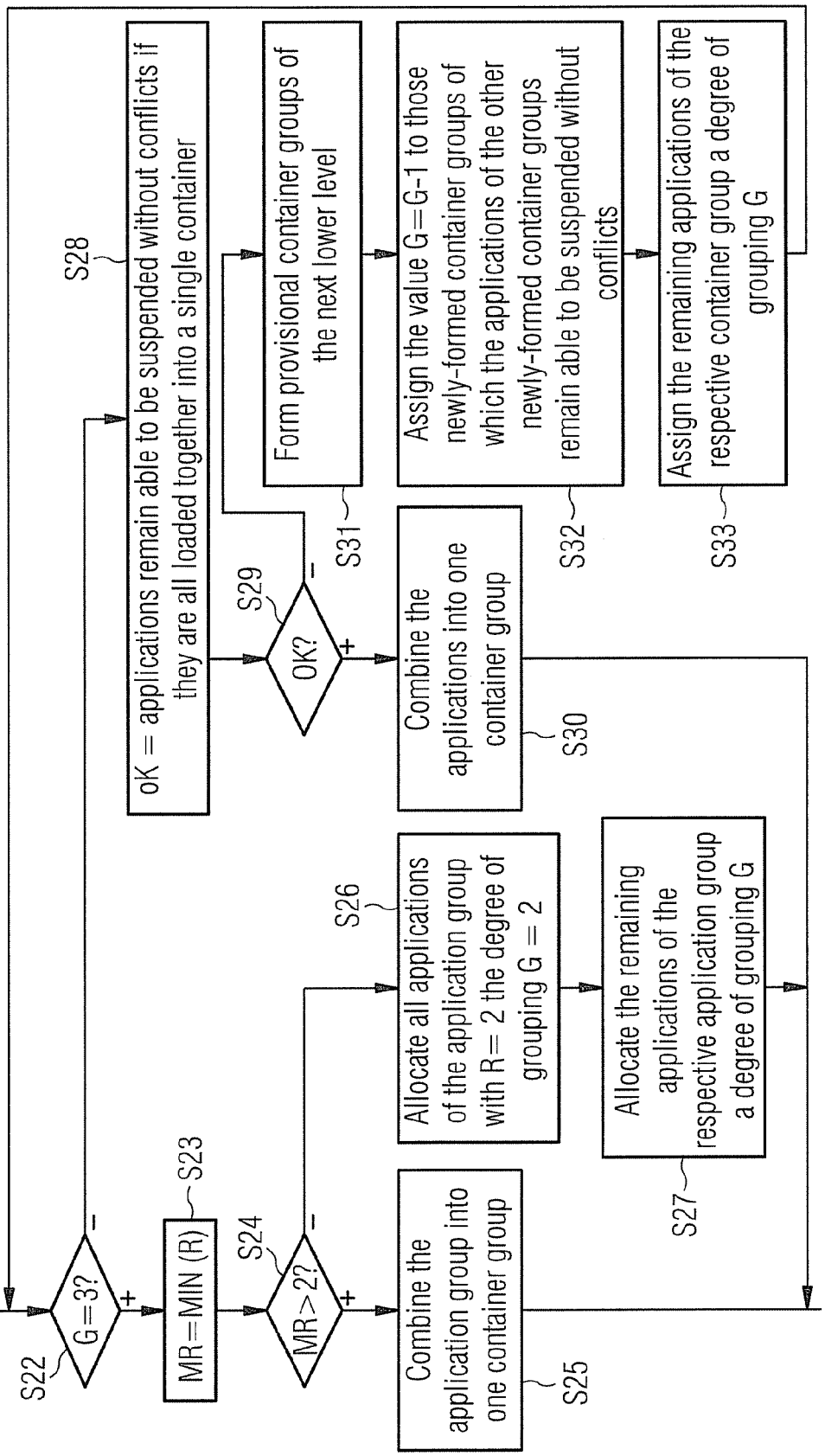

In accordance with FIG. 8, in a step S21, the computer first sets the degree of grouping G to the pre-start level V. In a step S22 the computer then checks whether the degree of grouping G has the value three.

The value three corresponds—both within the framework of the pre-start level V and also within the framework of the degree of grouping G—to an application group 13. The value three thus means within the framework of the pre-start level V that an application group 13 will be pre-started. Within the framework of the degree of grouping G the value three means that an application group 13—with the exception of the applications 14 not able to be suspended of the respective application group 13—is loaded as a unit into a single container 16.

An individual application group 13 corresponds to a single configuration within the meaning of the maturity level R. The application group 13 may thus be loaded into a single container if and only if all applications 14 of the respective application group 13 have the level of maturity R=3 or the level of maturity R=4. In a step S23 the computer thus determines the minimum value MR of the level of maturity R of the applications 14 of the corresponding application group 13. In a step S24 the computer checks whether the minimum value MR is greater than two.

If the minimum value MR is greater than two, i.e. three or four, the computer combines the application group 13 in a step S25 into a (single) container group 17. If not, in a step S26, the computer allocates the degree of grouping G=2=application to all applications 14 of the same application group 13 to which the level of maturity R=2 is assigned. These applications 14 are thus loaded within the framework of the pre-start into their own container 16 in each case.

In a step S27 the remaining applications 14 of the respective application group 13 are assigned a degree of grouping G. Two alternate methods of operation are possible for this. On the one hand it is possible to also assign to these applications 14 the degree of grouping G=2. In this case these applications 14 too, although they are assigned the maturity level R=3 or R=4, are loaded individually into a separate container 16 in each case. Expressed in general terms—this method operation corresponds to determining the degree of grouping G uniformly for all container groups 17. As an alternative the computer can combine the applications 14 of the respective application group 13 to which the level of maturity R=3 or R=4 is assigned, into a single container group 17. This method of operation corresponds—expressed in general terms—to determining the degree of grouping G individually for each container group 17.

In steps S22 through S27 the case is dealt with in which application groups 13 are predetermined as a pre-start unit (pre-start level V=3). It is however possible to also predetermine larger units as a pre-start unit. In particular an entire sequence 15 of application groups can be predetermined as a pre-start unit (pre-start level V=4). In addition for each user—see FIG. 9—a respective profile can be predefined as to which complex tasks 12 may be requested by the corresponding user 10. In this case, as an alternative or in addition, the value five (=individual user, meaning that all complex tasks 12 form the pre-start unit for this user 10) can be predetermined as the pre-start level V. In individual cases it can even be possible to predetermine the complex tasks 12 of a number of users 10 (in the extreme case even all users 10) as the pre-start unit. This corresponds to the value six of the pre-start level V.

If the value of the pre-start level V is greater than three, the computer goes from step S22 to a step S28. In step S28 the computer determines whether the applications 14 remain able to be suspended without conflicting with each other if they are all loaded together into a single container 16. The term "able to be suspended without conflicting with each other" has the following meaning in this case that each application 14 loaded into the respective container 16 is able to be suspended and resumed again and
that each application 14 loaded into the respective container 16 can operate in each application group 13 provided accordingly in the complex task 12.

The ability to be suspended without conflicting, for the pre-start level V of four or greater, requires inter alia that all associated applications 14 are assigned the level of maturity R=4.

In a step S29 the computer checks whether the ability to be suspended without conflict is provided. If it is provided the computer combines the applications 14 in a step S30 into an individual container group 17. It is thus assigns all corresponding applications 14 the current degree of grouping G. If the ability to be suspended without conflicting is not provided, in a step S31 the computer forms provisional container groups 17 of the next-lower degree of grouping G. In the event of a degree of grouping G of six (=plurality of users) the computer thus forms corresponding container group 17 for the individual users 10. In the event of a degree of grouping G of five (=individual users) the computer forms the corresponding container groups 17 for the sequences of application groups etc. In the event of a degree of grouping of four (=sequence) the computer forms the corresponding container group 17 for the individual application groups 13 of the corresponding sequence 15.

In a step S32 the computer checks, for each container group 17 newly formed in step S31, whether they can cooperate with the other container groups and 17 newly formed in step S31.

Each provisional container group which cannot cooperate with the other provisional container groups 17 without conflicts, forms a new container group 17 for the next iteration of the procedure of FIG. 8. These container groups 17 are allocated a degree of grouping G reduced by one by the computer, for example a value of four if the value five applied previously.

In respect of the other provisional container groups 17 which can cooperate with one another without conflicts, in accordance with a step S33 grouping into a single container group 17 or allocation of a degree of grouping G reduced by one is possible. The first-mentioned procedure corresponds—expressed in general terms—to determining the degree of grouping G individually for each container group 17, the last-mentioned to uniform determination for all container groups 17.

Provided the step S33 is executed and there is a return from this step to step S22, the renewed execution of the procedure of FIG. 8 naturally occurs for each of the provisional container groups 17 newly formed within the framework of the step S32. If within the framework of step S33 the corresponding container groups were respectively assigned the degree of grouping G reduced by one, these container groups 17 can be loaded directly within the framework of step S33 into an individual container 16 (and subsequently suspended).

The procedure above explained in conjunction with FIGS. 6 and 8 is executed iteratively. A pre-start of a corresponding unit is thus undertaken repeatedly. The pre-start occurs until an abort criterion is fulfilled. The abort criterion can depend for example on the number of pre-started units, on the processor loading, on the number of logged-on users 10 and on other criteria. Its precise design is of subordinate importance within the framework of an embodiment of the present invention.

Figure 10:
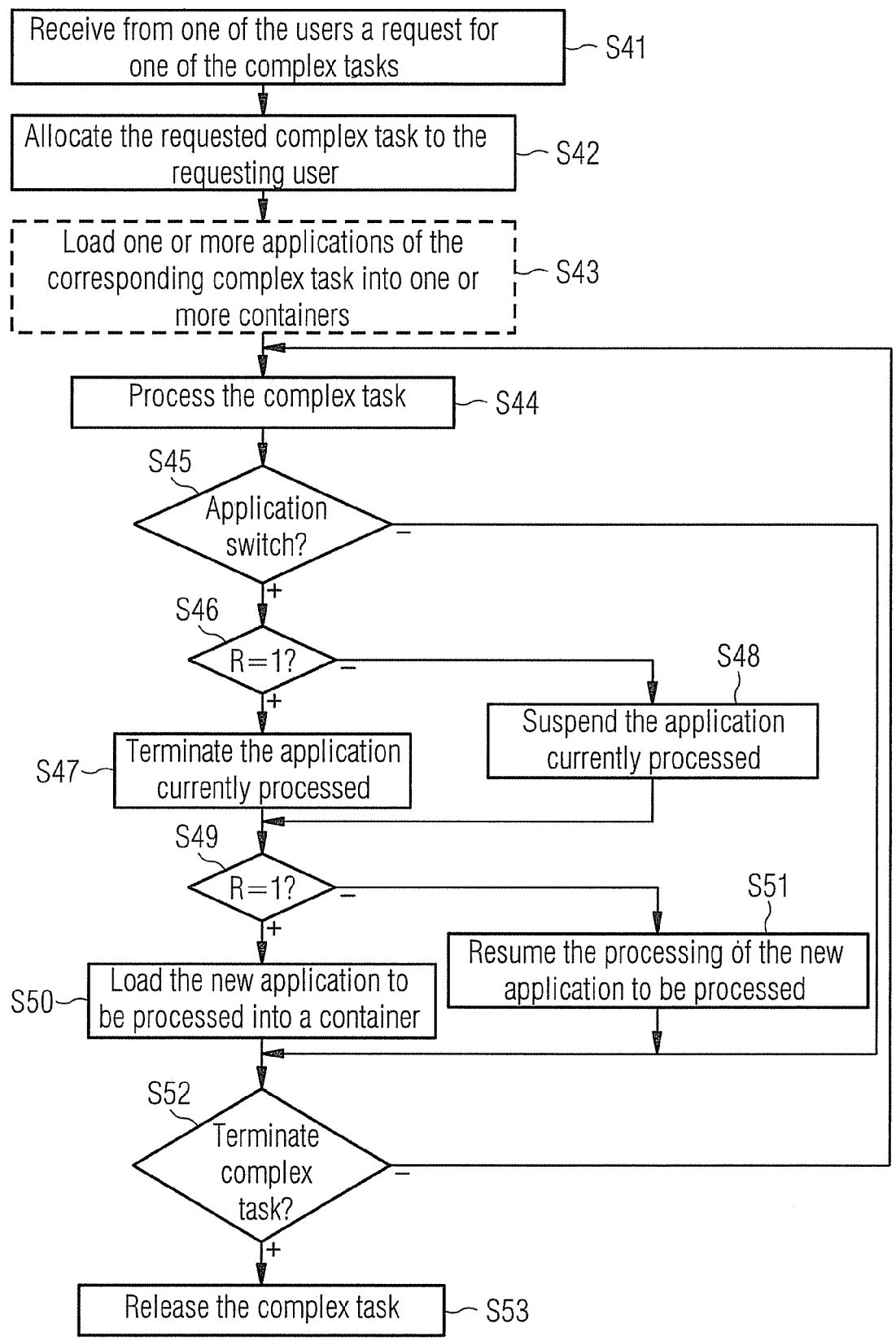

As a result of the pre-start—from the point of view of the user 10—the actual operation with the applications 14 can be undertaken significantly more easily and more quickly than in the prior art. This is explained in greater detail below in conjunction with FIG. 10. The method of operation of FIG. 10 is executed by the computer in parallel to the method of operation of FIGS. 6 and 8. As a rule the method of operation of FIG. 10 is executed after a few pre-starts have already been executed by the computer.

In accordance with FIG. 10 the computer, in a step S41, receives from one of the users 10 a request for one of the complex tasks 12. In a step S42 the computer assigns the requested complex task 12 to the requesting user 10. In a step S43 the computer loads one or more applications 14 of the corresponding complex task 12 into one or more containers 16.

The step S43 is only shown in FIG. 10 for the sake of completeness. This is because the loading of the applications 14 is only necessary within the framework of step S43 if the pre-start level V=1 is pre-specified, so that within the framework of the pre-start no applications 14 are loaded into the pre-started containers 16 (see step S2 of FIG. 6) or if the first application 14 to be executed within the framework of the requested complex task 12 is assigned the level of maturity R=1 (=not able to be suspended) so that it can not be pre-started.

The complex task 12 is processed in a step S44. In a step S45 the computer checks whether a switch is to be made from the application 14 presently being executed to another application 14. If this is the case, in a step S46 the computer checks the level of maturity R of the application 14 presently being processed. If the level of maturity R of the application 14 presently being processed has the value one, i.e. the application 14 is not able to be suspended, the computer, in a step S47, terminates the application 14 currently being processed. Otherwise, in a step S48, the computer suspends the application 14 currently being processed.

In a similar manner the computer checks in a step S49 whether the application 14 for which processing is to be started is assigned the maturity level R=1. If this is the case the computer, in a step S50, loads the new application 14 to be processed. Otherwise the computer, in a step S51, merely resumes the processing of the suspended application 14.

In a step S52 the computer checks whether the complex task 12 is to be terminated. If this is not the case the computer returns to step S44. Otherwise, in a step S53, the computer releases the complex task 12. If necessary a suspension and/or termination of applications 14 can be undertaken within the framework of step S53.

From the information given above it is obvious that applications 14 can be terminated within the framework of normal processing if and only if this is required. Otherwise they are merely suspended so that their processing can be resumed. This method of operation is significantly faster than a complete new start of an application 14. Furthermore within the framework of an embodiment of the present invention the number of containers used and the associated allocation of resources of the computer can be kept as small as possible.

Within the framework of the method of operation explained above in conjunction with FIGS. 6 and 8, it was assumed that the computer determines the degree of grouping G of the container group 17 exclusively on the basis of the level of maturity R of the applications 14 and the computer determines the degree of grouping G such that the number of container groups 17 will be minimized. This method of operation is possible. In many cases however modifying the method of operation of FIG. 8 in accordance with FIG. 11 leads to better results.

FIG. 11 essentially corresponds to FIG. 8. The only difference lies in the fact that step S21 of FIG. 8 is replaced by a step S61. In step S61 the computer sets the initial (=maximum) degree of grouping G to the smaller of two values. The one value is the already explained pre-start level V. The other value is a pre-determined maximum degree of grouping, referred to as container level C below. The container level C has one of the values two to six, with the values having the same meaning as they do for pre-start level V.

Preferably the container level C can be pre-specified as required, can thus have at least two of the stated values, especially all values. The container level C can be pre-specified in the same manner as the pre-specification of the pre-start level V by a system technician.

Because of the replacement of step S21 of FIG. 8 by step S61 of FIG. 11, the degree of grouping G is restricted to the container level C in the method of operation of FIG. 11. Other than this however the computer continues to determine the degree of grouping G exclusively on the basis of the maturity level R of the applications 14 such that the number of container groups 17 will be minimized.

Embodiments of the present invention has many advantages. In particular it is easy to implement, operates reliably and is effective. Furthermore embodiments of the present invention are very flexible. In particular the pre-start level V and if necessary the container level C can be adapted at any time. For changes in the level of maturity R the computer determines new degrees of grouping G by itself if necessary. On replacement of "old" applications 14 by "new" applications 14 to which another level of maturity R is assigned, the method of FIGS. 6, 8 and 11 plus thus do not have to be adapted. Furthermore if necessary a limitation of the degree of grouping G is possible at any time by pre-specifying the container level C accordingly.

The above description serves exclusively to explain the embodiments of present invention. The scope of the protection of the present invention on the other hand is intended to be exclusively defined by the enclosed claims.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, non-transitory computer readable medium and non-transitory computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a non-transitory computer readable medium and is adapted to perform any one of the aforementioned methods when run on a computer device (a device including a processor). Thus, the non-transitory storage medium or non-transitory computer readable medium, is adapted to store information and is adapted to interact with a data processing facility or computer device to execute the program of any of the above mentioned embodiments and/or to perform the method of any of the above mentioned embodiments.

The non-transitory computer readable medium or non-transitory storage medium may be a built-in medium installed inside a computer device main body or a removable non-transitory medium arranged so that it can be separated from the computer device main body. Examples of the built-in non-transitory medium include, but are not limited to, rewriteable non-volatile memories, such as ROMs and flash memories, and hard disks. Examples of the removable non-transitory medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

LIST OF REFERENCE SIGNS

1 Microprocessor
2 Main memory
3 Mass storage device
4 Interface
5 Computer network
6 Clients
7 Computer program
8 Machine code
9 Mobile data carrier
10 User
11 Operating system
12 Complex tasks
13 Application groups
14 Applications
15 Sequence
16 Container
17 Container group
C Container level
G Degree of grouping
MR Minimum value
R Maturity level
S1-S61 Steps
V Pre-start level

What is claimed is:

1. A method for a computer which, at the request of a number of users, processes a number of complex tasks within the framework of its operating system, each complex task being able to be requested by at least one of the number of users, the computer performing the method comprising:
creating, within the framework of executing each complex task, a number of processes embodied as containers;
loading at least one application into each of the containers created within the framework of the complex task;
combining the applications loaded into the containers within the framework of the execution of the respective complex task into at least one application group;
chaining, in the event of forming a number of application groups within the framework of executing the respective complex task, the application groups into a sequence of application groups, application groups following each other directly within the sequence differing by at least one application,
wherein, in the event of a single application group, the application group represents the single complex task and in the event of a sequence of application groups, the sequence of application groups represents the respective single complex task,
wherein a pre-start level is pre-specified to the computer, the pre-start level including at least one of a value of an empty container, a value application and at least one higher value, the at least one higher value corresponding to one of the values application group, sequence, individual user or plurality of users,
wherein each application is assigned a respective level of maturity which has at least one of a value able to be suspended, a value able to be suspended but only able to be run on its own in the container, a value able to be suspended and able to be run with other applications in the same container and a value able to be suspended and able to be run in a number of configurations with other applications in the same container;
iteratively undertaking, even before the request for processing the complex tasks, a pre-start of a respective unit corresponding to the pre-start level;
creating, in the event of the pre-start level having the value empty container, the container within the framework of the pre-start, but not yet loading any application into the container;
creating, in the event of the pre-start level having the value application, a container within the framework of the pre-start for each respective application, with an exception of applications not able to be suspended, and loading the respective application into the container created for the respective application;
determining, in the event of the pre-start level having the higher value, a degree of grouping within the framework of the pre-start for the applications assigned to the respective pre-start unit with an exception of applications not able to be suspended using their level of maturity, combining the applications in accordance with the degree of grouping determined into at least one container group, creating a container for each respective container group and loading each container group into the container created for the respective container group,
wherein the degree of grouping is determined such that the applications combined into the respective container group remain within the respective container group able to be suspended without conflicting with each other; and
only terminating, within the framework of processing the complex tasks after assignment to one of the users, on switching from one application to another application, only terminates the application still being executed in if it involves an application not able to be suspended and otherwise suspends the application still being executed.

2. The method of operation as a claimed in claim 1, wherein the computer individually determines the degree of grouping for each container group formed within the framework of the respective pre-started unit.

3. The method of operation as claimed in claim 2, wherein the computer determines the degree of grouping exclusively on the basis of the level of maturity of the applications and the computer determines the degree of grouping such that the number of container groups is minimized.

4. The method of operation as claimed in claim 2, wherein a container level having one of the values application, application group, sequence, individual user or plurality of users is pre-specified to the computer, and wherein the computer determines the degree of grouping by restricting the degree of grouping to the predetermined container level and also determines the degree of grouping exclusively on the basis of the level of maturity of the applications such that the number of container groups is minimized.

5. The method of operation as claimed in claim 4, wherein at least two of the values application, application group, sequence, individual user and plurality of users are permitted for the container level.

6. The method of operation as claimed in claim 1, wherein the computer determines the degree of grouping for all container groups formed within the framework of the respective pre-started unit in a uniform manner.

7. The method of operation as claimed in claim 6, wherein the computer determines the degree of grouping exclusively on the basis of the level of maturity of the applications and the computer determines the degree of grouping such that the number of container groups is minimized.

8. The method of operation as claimed in claim 6, wherein
a container level having one of the values application, application group, sequence, individual user or plurality of users is pre-specified to the computer, and wherein the computer determines the degree of grouping by restricting the degree of grouping to the predetermined container level and also determines the degree of grouping exclusively on the basis of the level of maturity of the applications such that the number of container groups is minimized.

9. The method of operation as claimed in claim 8, wherein at least two of the values application, application group, sequence, individual user and plurality of users are permitted for the container level.

10. The method of operation as claimed in claim 1, wherein the computer determines the degree of grouping exclusively on the basis of the level of maturity of the applications and the computer determines the degree of grouping such that the number of container groups is minimized.

11. The method of operation as claimed in claim 1, wherein
a container level having one of the values application, application group, sequence, individual user or plurality of users is pre-specified to the computer, and wherein the computer determines the degree of grouping by restricting the degree of grouping to the predetermined container level and also determines the degree of grouping exclusively on the basis of the level of maturity of the applications such that the number of container groups is minimized.

12. The method of operation as claimed in claim 11, wherein at least two of the values application, application group, sequence, individual user and plurality of users are permitted for the container level.

13. A non-transitory data carrier comprising:
a computer program stored in machine-readable form which, when processed by a computer, causes the computer to exercise the method as claimed in claim 1.

14. The non-transitory data carrier as claimed in claim 13, wherein the data carrier is built into the computer as mass storage device from which the computer program is able to be executed.

15. A non-transitory mobile data carrier comprising:
a computer program stored in machine-readable form which, when processed by a computer, causes the computer to exercise the method as claimed in claim 1.

16. A non-transitory computer readable medium including program segments for, when executed on a computer device, causing the computer device to implement the method of claim 1.

* * * * *